B. T. STEBER.

MACHINE FOR SLITTING CLOTH.

APPLICATION FILED OCT. 16, 1912.

Reissued Feb. 11, 1913.

13,528.

2 SHEETS—SHEET 1.

Inventor

Bernard T. Steber.

Witnesses

J. M. Fowler Jr.

L. P. Morriel

By Mason Fenwick & Lawrence.

Attorneys

B. T. STEBER.
MACHINE FOR SLITTING CLOTH.
APPLICATION FILED OCT. 16, 1912.
Reissued Feb. 11, 1913.
13,528.
2 SHEETS—SHEET 2.
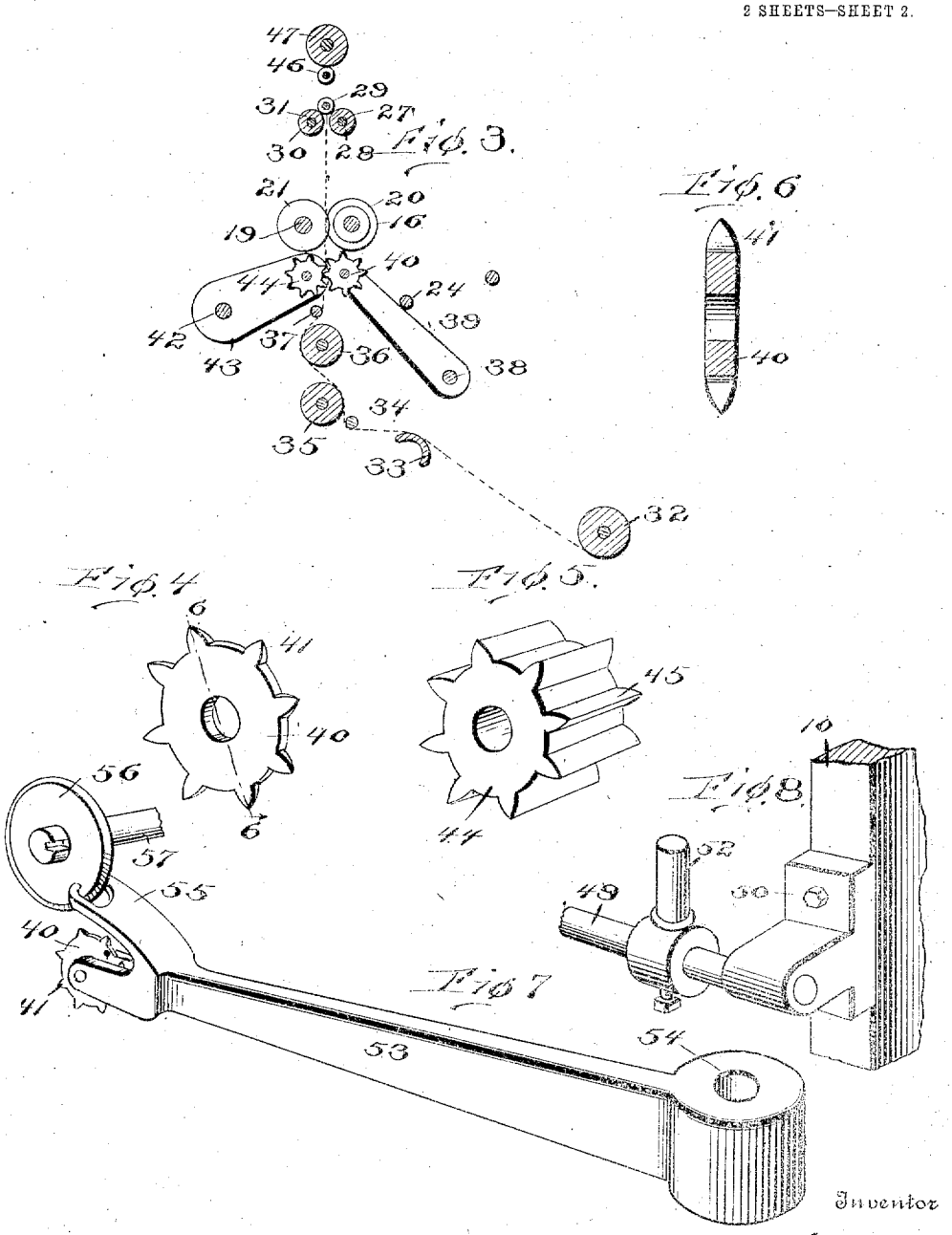
Witnesses
J. M. Fowler Jr.
L. L. Morrell
Inventor
Bernard T. Steber,
By Mason Fenwick & Lawrence.
Attorneys

UNITED STATES PATENT OFFICE.

BERNARD T. STEBER, OF UTICA, NEW YORK, ASSIGNOR TO NEW HARTFORD COTTON MANUFACTURING COMPANY, OF NEW HARTFORD, NEW YORK, A CORPORATION OF NEW YORK.

MACHINE FOR SLITTING CLOTH.

13,528. Specification of Reissued Letters Patent. Reissued Feb. 11, 1913.

Original No. 1,025,931, dated May 7, 1912, Serial No. 645,507. Application for reissue filed October 16, 1912. Serial No. 726,164.

*To all whom it may concern:*

Be it known that I, BERNARD T. STEBER, a citizen of the United States, residing at Utica, in the county of Oneida and State of New York, have invented certain new and useful Improvements in Machines for Slitting Cloth; and I do hereby declare the following to be a full, clear, and exact description of the invention, such as will enable others skilled in the art to which it appertains to make and use the same.

This invention relates to cloth slitting machines and has for an object to provide a machine for slitting webs of cloth to follow the warp threads with fidelity and to prevent the cutting of said warp threads to form ravelings or short threads. The principal use of the said machine is in the cutting of bands or strips of cloth, such as are used for surgical bandages and which may be produced free from loose pieces of threads along their cut edges.

A further object of the invention is to provide a machine which in its cutting will follow the warp threads and prevent waste of the cut material.

A further object of the invention is to provide a guiding wheel proportioned to follow a continuous warp thread throughout the length of the web of cloth cut and to either guide the cloth relative to the cutters or to guide the cutters relative to the cloth.

With these and other objects in view the invention comprises certain novel constructions, combinations and arrangement of parts as will be hereinafter more fully described and claimed.

Figure 1:
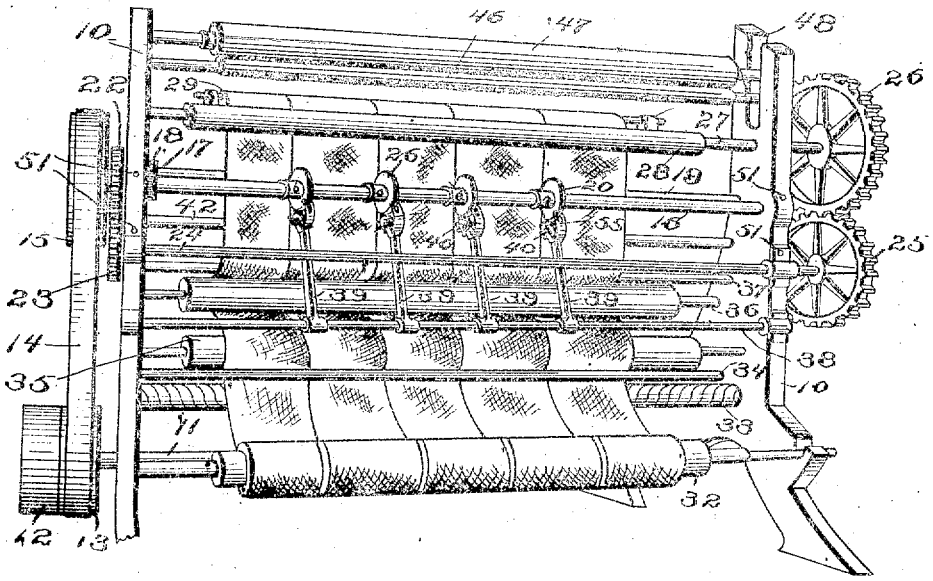
Figure 2:
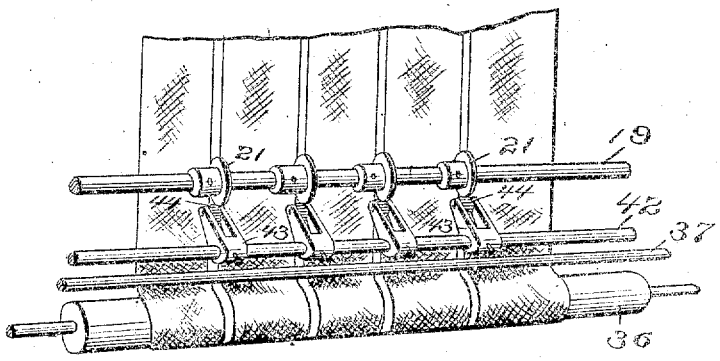

Figure 1 is a perspective view of the machine seen from the front. Fig. 2 is a fragmentary perspective view of the back of the machine. Fig. 3 is a diagrammatic view showing the travel of the web of cloth through the machine. Fig. 4 is a perspective view of the guiding wheel. Fig. 5 is a perspective view of the holding-in wheel. Fig. 6 is a diametrical sectional view of the guiding wheel taken on line 6—6 of Fig. 4. Fig. 7 is a perspective view of one of the cutter members and guiding wheels with a movable or adjustable arm. Fig. 8 is a perspective view of the mounting of the adjustable arm shown at Fig. 7.

Like characters of reference designate corresponding parts throughout the several views.

The improved machine which forms the subject matter of this application comprises a frame 10 having a shaft 11 journaled therein provided with a pulley 12 adapted to receive motion from any usual source of power and with a pulley 13 over which passes a belt 14 connected with the pulley 15 by which the machine is actuated. The pulley 15 is mounted upon the shaft 16 also journaled in the frame 10, which latter shaft is provided with a gear 17 intergeared with a gear 18 carried upon a shaft 19. The shafts 16 and 19 carry respectively cutters 20 and 21 secured upon said shafts in any approved manner and serving together to form a shear. The shaft 16 is also provided with a gear 22 intergeared with a gear 23, the latter carried upon a shaft 24 which at the opposite end of the machine is provided with a gear 25 intergeared with a gear 26 carried upon a shaft 27. The shaft 27 is provided with a roller 28 which has frictional engagement with roller 29, the latter roller bearing on said roller 28 and on a roller 30 carried by a shaft 31 similar in all respects to the roller 28 upon the shaft 27.

The cloth to be operated upon is carried upon a roller 32 and passes from such roller over the spreader 33, which said spreader is provided with inclined ribs diverging from the center of said spreader in the usual well known manner which serve to hold the cloth passing thereover in taut condition. A rod 34 is provided to serve as a tension rod to hold the cloth in engagement with the spreader 33 and also in engagement with a roller 35 in front of which the cloth passes and then to the rear of a similar roller 36, a second tension rod 37 being provided to produce the necessary frictional engagement of the cloth with said rollers.

Mounted upon the frame is a rod 38 having mounted thereon a plurality of arms 39, each of said arms having a guiding wheel 40 journaled therein. The guiding wheel 40 is shown in perspective at Fig. 4 and in diametrical section at Fig. 6 and is a comparatively thick wheel provided with teeth or spurs 41 spaced about the periphery of such wheel, the teeth or spurs being of such thickness and form that when once inserted between the warp threads of a web of cloth it causes the warp threads to spread from each side of such spur forming thereby an opening for the next tooth in series which likewise spreads the threads so that each tooth as the web of cloth advances spreads the warp threads for the next succeeding tooth whereby the several teeth follow exactly between the same warp threads throughout the entire length of the web of cloth. Under ordinary conditions the elasticity of the web of cloth itself is sufficient to provide for the necessary guiding so that the guiding wheels may be held against bodily movement longitudinally of their axes.

To hold the cloth so that the guiding wheels will properly operate a rod 42 is also mounted upon the frame and a plurality of arms 43 mounted upon such rod in manner similar to the mounting of the arms 39. Upon these arms 43 holding-in wheels 44 are journaled, such holding-in wheels being provided with longitudinally extending ribs 45, as shown particularly at Fig. 5 so proportioned that the teeth 41 of the guiding wheel 40 will intergear with such ribs as indicated more particularly at Fig. 3 whereby the teeth of the guiding wheel 40 will serve to more easily penetrate the web.

To insure the proper feeding of the cloth weighted rollers 46 and 47 are mounted in slots 48 in the frame and are dropped upon the web of cloth passing over the roller 29. The weighted rollers hold the roller 29 in frictional engagement with the driven rollers 28 and 30 so that the rotation of said rollers 28 and 30 causes the rotation of the roller 29 to draw the cloth through the mechanism described from the roller 32 to slit the strip into as many strips as there are shear members 20 and 21. In the drawing four of these shear members are shown but it is to be understood that the exact number is wholly immaterial to the present invention and that the number may be increased or decreased at will, and that the spacing may be varied to produce strips of such width as may be required.

Under some conditions the texture of the cloth is such that it is not easily guided and it becomes desirable to adjust the slitting mechanism. Under such conditions the above described slitting mechanism consisting of the rods 38 and 42, the arms 39 and 43, the shafts 16 and 19 with their shear members 20 and 21 are removed and a rod 49 shown in perspective at Fig. 8 is applied to the frame by attaching the bracket 50 at the holes 51 provided for that purpose. The rod 49 is provided with a plurality of spindles 52 upwardly directed therefrom and an arm 53 is provided with a socket 54 adapted to set over said spindles 52. The arm is provided with a guiding member 55 which engages upon opposite sides of a cutter 56 splined slidably upon a shaft 57, which said shaft 57 takes the place of the shaft 16. The cutter 56 is sharpened so that a shear action is not necessary and a single cutter performs the operation. It will be apparent that the guide wheel 40 will engage the warp threads of the cloth in the manner above described but instead of moving the cloth the arm itself is swung upon the spindle 52 as a pivot carrying therewith the cutter 56 so that the cutter 56 follows the warp threads as above described.

The introduction of the cloth and its progress through the machine and its winding upon the roller 29 are the same whether the cloth is itself guided relative to the cutters or whether the cutters are guided relative to the cloth. In either case when the web of cloth has passed through the machine and is wound upon the roller 29 the weighted rollers 46 and 47 are removed permitting the removal of the roller 29 and the removal of the rolls of strips wound upon said roller. The roller 29 is of any usual and ordinary construction which permits the removal of such rolls of cloth, such for instance as being slotted or made in two halves and held together by collars which is well known in the art.

It will be understood that under many conditions in the manufacture of the cloth to be slitted warp threads may be omitted at the proper location for the slitting, in which case the guiding wheels will properly follow the track of the omitted warp threads which avoids the necessity of spreading the threads of the normal weave. The operation, however, of the guiding members, of the slitting members and all other parts of the machine is exactly identical where the cloth is woven for the especial purpose of being slitted as where a web of cloth of the ordinary weave has been employed and the warp threads spread apart or "waived" by the teeth of the guiding wheel.

I claim:

1. In a machine for slitting cloth into strips, the combination of guiding means which enter between two strands of warp thread, an adjacent support to prevent the cloth from sagging away from said guiding means and cutting means which enter between the same two strands of warp thread, with means for moving the cloth in a direction longitudinal with its warp thread.

2. In a machine for cutting cloth into strips, the combination of guiding means which enter between two strands of warp thread, an adjacent support to prevent the cloth from sagging from said guiding means and cutting means which cut between the same two strands of warp thread with means for moving the cloth in a direction longitudinal with its warp thread and means for rolling the strips into rolls.

3. In a machine for slitting cloth into strips, the combination of guiding means which enter between two strands of warp thread, an adjacent support to prevent the cloth from sagging from said guiding means and cutting means which enter between the two strands of warp thread, with means for moving the cloth in a direction longitudinal with its warp thread.

4. A machine for cutting woven cloth comprising a series of threads extending in one direction, and a series of crossing threads into strips, the combination of guiding means which extend through the cloth between two given strands of the warp threads which form the weave, means for holding the cloth up to the guiding means, and cutting means which cut the crossing threads.

5. In a machine for slitting cloth, the combination of a toothed guiding member, extending through the cloth between two strands of warp thread from one face of the cloth, and a toothed member intermeshing therewith on the other face of the cloth, with means for moving the cloth in a direction longitudinal with the warp thread.

6. In a machine for slitting cloth, the combination of a toothed guiding member, extending through the cloth between two strands of warp thread from one face of the cloth, and a toothed member intermeshing therewith on the other face of the cloth, with means for moving the cloth in a direction longitudinal with the warp threads, and means for cutting the cloth into strips.

7. In a machine for slitting cloth, the combination of a toothed guiding wheel, extending through the cloth between two strands of warp thread from one face of the cloth, and a toothed member meshing therewith on the other side of the cloth, with means for moving the cloth in a direction longitudinal with the warp threads, means for cutting the cloth into strips, and means for winding the strips into rolls.

8. In a machine for slitting cloth where certain warp threads have been omitted, the combination of guiding means to enter the parts where the warp threads have been omitted, supporting means to hold the weft thread between the guiding means, and cutting means for cutting the weft threads where the warp threads have been omitted with means for feeding the cloth.

9. In a machine for slitting cloth wherein certain warp threads have been omitted the combination of a toothed guiding wheel, a toothed holding-in wheel to hold the strands of weft thread between the teeth of the guiding wheel, and a weft thread cutter, with means for feeding cloth from the roll.

10. In a machine for slitting cloth, the combination of a toothed guiding wheel, a toothed holding-in wheel for preventing the cloth from sagging, and a weft thread cutter, with means for feeding cloth from a roll.

11. In a machine for slitting cloth, the combination of a pointed guiding member, a grooved holding-in member, a second pointed guiding member, and grooved holding-in member following said guiding and holding-in member, and a cutting member, with means for winding cloth upon a roll.

12. In a machine for slitting cloth wherein certain warp threads have been omitted, the combination of a pointed guiding member to enter the portions where the warp threads have been omitted, means for supporting the cloth where the pointed member enters and cutting means for cutting the weft threads where the warp threads have been omitted, with means for feeding the cloth.

13. In a machine for slitting cloth, the combination of an independently swinging guiding wheel carrying arm, a toothed guiding wheel carried by said arm, and a movable cutter slidably mounted on a revoluble shaft, with connecting means between the swinging arm and cutter for causing the cutter to slide upon the revoluble shaft.

14. In a machine for slitting cloth, the combination of guiding means which enter between two strands of warp from one face of the cloth, holding-in means on the opposite face of the cloth, a movable member actuated by said guiding means, and a cutter connected with said movable member in such a manner as to move together.

15. In a machine for slitting cloth the combination of a guiding wheel located on one face of the cloth, a wheel for holding the cloth to the guiding wheel located on the opposite side of the cloth at a position opposite the guiding wheel, a cutter, and a spreader to draw the two outer edges of the cloth apart and keep it from gathering wrinkles.

16. In a machine for slitting cloth, the combination of a toothed guiding wheel, a toothed holding-in wheel in mesh with the toothed guiding wheel, a cutter, and a spreader to draw the two outer edges of the cloth apart and keep it from gathering wrinkles.

17. In a machine for slitting cloth the combination of a toothed guiding wheel, a toothed holding-in wheel to keep the cloth in contact with the guiding wheel, a cutter, and a spreader to draw the two outer edges of the cloth apart and keep it from gathering wrinkles.

18. The combination of pointed guiding means to enter between two strands of warp threads of a woven fabric, means for holding the guiding means in mesh with the cloth and preventing the same from sagging, a cutter, and means for spreading the cloth.

19. In a machine for rolling up cloth, in which certain warp threads have been omitted the combination of means to guide said cloth, consisting of projections extending entirely through the cloth from one face, with adjacent means for holding the cloth in contact with said guiding means to prevent the cloth from sagging.

In testimony whereof I affix my signature in presence of two witnesses.

BERNARD T. STEBER.

Witnesses:
R. R. DAVIS,
H. P. OSBORN.